Patented Nov. 28, 1933

1,936,901

UNITED STATES PATENT OFFICE 1,936,901

METHOD OF CLEANING OIL

Leonard T. Evans, Indianapolis, Ind.

No Drawing. Application January 13, 1930
Serial No. 420,635

1 Claim. (Cl. 196—16)

My invention relates to improvements in methods of renovating lubricating oil for the purpose of removing therefrom impurities which have accumulated therein during the use of the oil. My method is particularly applicable to the renovation of automobile crank case oil, oil which has been removed from waste, used in the lubricating of car axles, journals and the like. Such oil after having been used contains carbon, sand, metal particles, salt and insoluble matter of various kinds, and it is one of the objects of my invention to precipitate the foreign matter in the oil for the purpose of removal and clarifying the oil so that it may be again used.

In carrying out my method, the oil to be renovated is placed in a suitable tank or container and heated, although at this state the heating is not essential. Acid fat (red oil) in quantities approximately 1 gallon to one hundred gallons of oil, chloride of lime in quantities of about 6 to 8 gallons to one hundred gallons of oil and sulphuric acid in quantities of about 6 pounds to 100 gallons of oil are added to the oil. The oil is then agitated for a suitable period and afterwards, I add silicate of soda in quantities of approximately 50 to 100 pounds of silicate of soda to 100 gallons of oil. In addition to the silicate of soda, I add to the oil water in quantities of from 10 to 20 gallons per 100 gallons of oil. The water may be added in liquid state or in the form of super heated steam. This mixture is agitated for a period of from one to two hours and at the same time it is heated to a temperature from 125 degrees Fahrenheit to 250 degrees Fahrenheit. The agitating and heating thoroughly mixes the silicate of soda with the oil, the heat serving to evaporate and drive off the lighter volatiles which may have accumulated in the oil and the water serves to increase the action of the silicate of soda. After the oil has been thoroughly agitated and heated, I add additional water in proportions of about 3 gallons to 100 gallons of oil and this mixture is then allowed to stand until all foreign matter has been precipitated and settled. After the foreign matter has been settled to the bottom of the container, the clear oil may be drawn off from the top and this oil is again heated to a temperature sufficient to evaporate any water which may be contained therein, the oil being agitated if desired during the heating.

I claim as my invention:

The method of renovating oil recovered from journal box waste which comprises bringing together a heated mixture of said oil, silicate of soda, water and saponifiable fatty material, maintaining the mixture at an elevated temperature, with agitation and thereafter permitting the mixture to stratify and drawing off the renovated oil.

LEONARD T. EVANS.